United States Patent
Wiersma et al.

(10) Patent No.: US 8,121,368 B2
(45) Date of Patent: Feb. 21, 2012

(54) 3D REAL-TIME TRACKING OF HUMAN ANATOMY USING COMBINED KV AND MV IMAGING

(75) Inventors: Rodney D. Wiersma, Chicago, IL (US);
Lei Xing, Palo Alto, CA (US); Weihua Mao, Plano, TX (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 629 days.

(21) Appl. No.: 12/291,829

(22) Filed: Nov. 12, 2008

(65) Prior Publication Data
US 2009/0208074 A1    Aug. 20, 2009

Related U.S. Application Data

(60) Provisional application No. 61/066,322, filed on Feb. 19, 2008.

(51) Int. Cl.
*G06K 9/00* (2006.01)
(52) U.S. Cl. ...................................................... 382/128
(58) Field of Classification Search .................. None
See application file for complete search history.

(56) References Cited

U.S. PATENT DOCUMENTS

| | | | |
|---|---|---|---|
| 7,221,733 B1 | 5/2007 | Takai | |
| 2003/0099328 A1* | 5/2003 | Jensen et al. | 378/198 |
| 2007/0025513 A1* | 2/2007 | Ghelmansarai | 378/98.8 |
| 2007/0291895 A1 | 12/2007 | Yin | |
| 2008/0031406 A1* | 2/2008 | Yan et al. | 378/14 |
| 2009/0208074 A1* | 8/2009 | Wiersma et al. | 382/128 |
| 2010/0172469 A1* | 7/2010 | Poulsen et al. | 378/20 |
| 2010/0316259 A1* | 12/2010 | Liu et al. | 382/107 |
| 2011/0075807 A1* | 3/2011 | Liu et al. | 378/65 |

OTHER PUBLICATIONS

Moseley et al., "Comparison of localization performance with implanted fiducial markers and cone-beam computed tomography for on-line image-guided radiotherapy of the prostate" International Journal of Radiation Oncology Biology Physics vol. 67, Issue 3, 1 Mar. 2007, pp. 942-953, doi:10.1016/j.ijrobp.2006.10.039.*
Berbeco et al., "Integrated radiotherapy imaging system (IRIS) design considerations of tumor tracking with linac gantry-mounted diagnostic x-ray systems with flat-panel detectors", Physics in Medicine and Biology 49, 2004, p. 243-255, PII S0031-9155(04)68365-5.*
Kamino et al., Int. J. Radiation Oncology Biol. Phys., vol. 66, No. 1, pp. 271-278, 2006.

* cited by examiner

*Primary Examiner* — Bhavesh Mehta
*Assistant Examiner* — Tahmina Ansari
(74) *Attorney, Agent, or Firm* — Lumen Patent Firm

(57) ABSTRACT

A medical imaging-based system and method uses both kV and MV images captured during a treatment period for organ motion tracking. 3D geometric locations of internal features are computationally tracked as a function of time from internal features, such as natural biological features or implanted fiducials, which are computationally extracted from the captured kV and MV images. A partial information method allows 3D tracking to be maintained in the event that imaging information is temporarily not available.

10 Claims, 5 Drawing Sheets

3D REAL-TIME TRACKING OF HUMAN ANATOMY USING COMBINED KV AND MV IMAGING

CROSS-REFERENCE TO RELATED APPLICATIONS

This application claims priority from U.S. Provisional Patent Application 61/066322 filed Feb. 19, 2008, which is incorporated herein by reference.

FEDERALLY-SPONSORED RESEARCH OR DEVELOPMENT

This invention was made with Government support under contract W81XWH-08-1-0128 awarded by the Department of Defense and contract CAI04205 awarded by the National Institutes of Health. The Government has certain rights in this invention.

FIELD OF THE INVENTION

The present invention relates generally to medical imaging devices and techniques. More specifically, it relates to methods to accurately monitor the three-dimensional (3D) geometric locations of internal organs as a function of time by the combined use of kilovolt (kV) and megavolt (MV) imaging.

BACKGROUND OF THE INVENTION

A goal of x-ray radiotherapy systems is to precisely deliver MV radiation beam to desired locations while minimizing exposure to undesired locations. Movement of internal organs during treatment poses a challenge to this goal. In recent years, some hybrid systems have combined MV treatment systems with kV diagnostic imaging systems, where the kV imager is used to guide the precise delivery of the MV treatment beam. For example, see Yin et al., US Patent Appl. Pub. 2007/0291895. The system of Yin et al., however, has the disadvantage that it requires tomographic rotation of the kV or MV beam around the patient to gather 3D target information. It is also limited to initial patient positioning before the start of radiation treatment and does not solve the problem of movement during a treatment session. There are also hybrid systems, such as the system described in Kamino et al., Int. J. Radiation Oncology Biol. Phys., Vol. 66, No. 1, pp. 271-278, 2006. This system uses two kV imagers for stereoscopic localization. While tomographic rotation is avoided through the use of multiple kV imagers, the system has the disadvantage that the additional kV imagers increase radiation exposure. The use of multiple kV imagers and beams also requires additional system complexity and expense.

SUMMARY OF THE INVENTION

In contrast with hybrid systems, the present invention integrates kV and MV sources to overcome the disadvantages of prior systems. In one aspect, the present invention provides a method for the use of the MV radiation treatment beam information (captured using a detector) together with kV imaging for 3D tracking of internal features as a function of time. The method only requires the use of one kV source for full 3D localization, leading to dose reduction to the patient as compared with prior methods using multiple kV sources. The method also provides tracking in real time during treatment. In another aspect, the invention also provides a technique to maintain 3D tracking in the event that the fiducials/organs are blocked by the MV beam-defining aperture or high-density material such as bone. Additionally, a partial information method (PIM) allows continuous tracking of internal features in the event that the kV or MV beam is switched off for a specific amount of time. The PIM is beneficial when using intensity modulated radiation treatment (IMRT) and/or for reducing radiation scatter that adversely affects image quality.

Significantly, according to embodiments of the present invention the MV treatment beam is used in combination with kV imaging for the purpose of 3D geometric localization of internal features (e.g., organs and fiducials) during the radiation delivery process. The method provides several advantages over prior methods. These advantages may include, for example, lower total radiation exposure to the patient due to the treatment beam being used for geometric anatomy monitoring; near real-time monitoring of geometric target location to insure accurate radiotherapy procedures; and no need for significant hardware modification on treatment machines pre-equipped with kV and MV imaging devices. The method also provides the ability to use partial geometric and/or temporal information to compute the location of fiducials/organs in the event that the MV beam defining aperture blocks the view of the marker/organ on the MV imager or that the target moves behind dense objects as bone, thereby facilitating continuous tracking during IMRT delivery. It also provides the ability to use partial information to maintain full 3D tracking as a function of time even when either the kV beam or the MV beam is switched off for a limited amount of time, thereby allowing continuous tracking during IMRT delivery and potential use for scatter reduction. The method can also maintain tracking for limited amounts of time when both beams are off.

According to one embodiment, a medical imaging-based method for organ motion tracking as a function of time is provided. The method includes capturing kV and MV images during a treatment period using a kV imaging detector and a MV radiotherapy beam imaging detector. The kV and/or MV images may be captured continuously or intermittently during the treatment period. The kV imaging detector may be, for example, a kV diagnostic imaging detector. Internal features, such as natural biological features or implanted fiducials, are computationally extracted from the captured kV and MV images. 3D geometric locations of internal features are computationally tracked as a function of time from the extracted internal features as well as from information describing geometry of the kV imaging detector and MV radiotherapy beam imaging detector. Preferably, the computational tracking may use a partial information method.

The method may be implemented by a medical imaging system which includes: kV and MV beam generators for generating kV and MV beams; kV and MV x-ray detector arrays for detecting the kV and MV beams; an image grabber to capture kV and MV images acquired using x-ray detector arrays; and a computer for predictively computing continuous 3D geometric locations of internal features as a function of time from the kV and MV images and from information describing geometry of the kV and MV beam generators and the kV and MV x-ray detector arrays. The kV and MV x-ray detectors are preferably flat panel detectors and the image grabber is preferably a hardware frame grabber. The computed locations may be displayed and/or output for further computation, storage, or feedback to other systems.

DETAILED DESCRIPTION

The present invention provides an improvement of radiotherapy systems together with methods for 3D tumor position monitoring during a treatment delivery. In one aspect, the present invention provides methods to perform 3D internal fiducial or image feature tracking as a function of time based on the combined use of kV and MV imaging. The MV in combination with kV imaging may be used to track the 3D real-time movements of metallic fiducials embedded in a moving subject. Partial geometric and/or temporal information is used to compute the location of fiducials/organs in the event that the MV beam defining aperture blocks the view of the marker/organ on the MV imager during IMRT delivery. The partial information may be used to maintain full 3D tracking as a function of time in the absence of one or both beams (kV & MV) for a short amount of time is also possible.

A challenge in the use of MV imaging data is that the MV images have low contrast, making it difficult to track internal markers using MV image data with high success rates. The present inventors have discovered techniques whereby simultaneous analysis of kV and MV images can account for this reduced contrast, and thus makes it possible to track nearly real-time 3D positions of multiple moving markers.

Present algorithm is completely automated—does not require initial manual selection of marker search regions—instead uses prior CT info to define the search space, providing smaller search space, less processing time, allowing real-time speeds for tracking.

Figure 1:
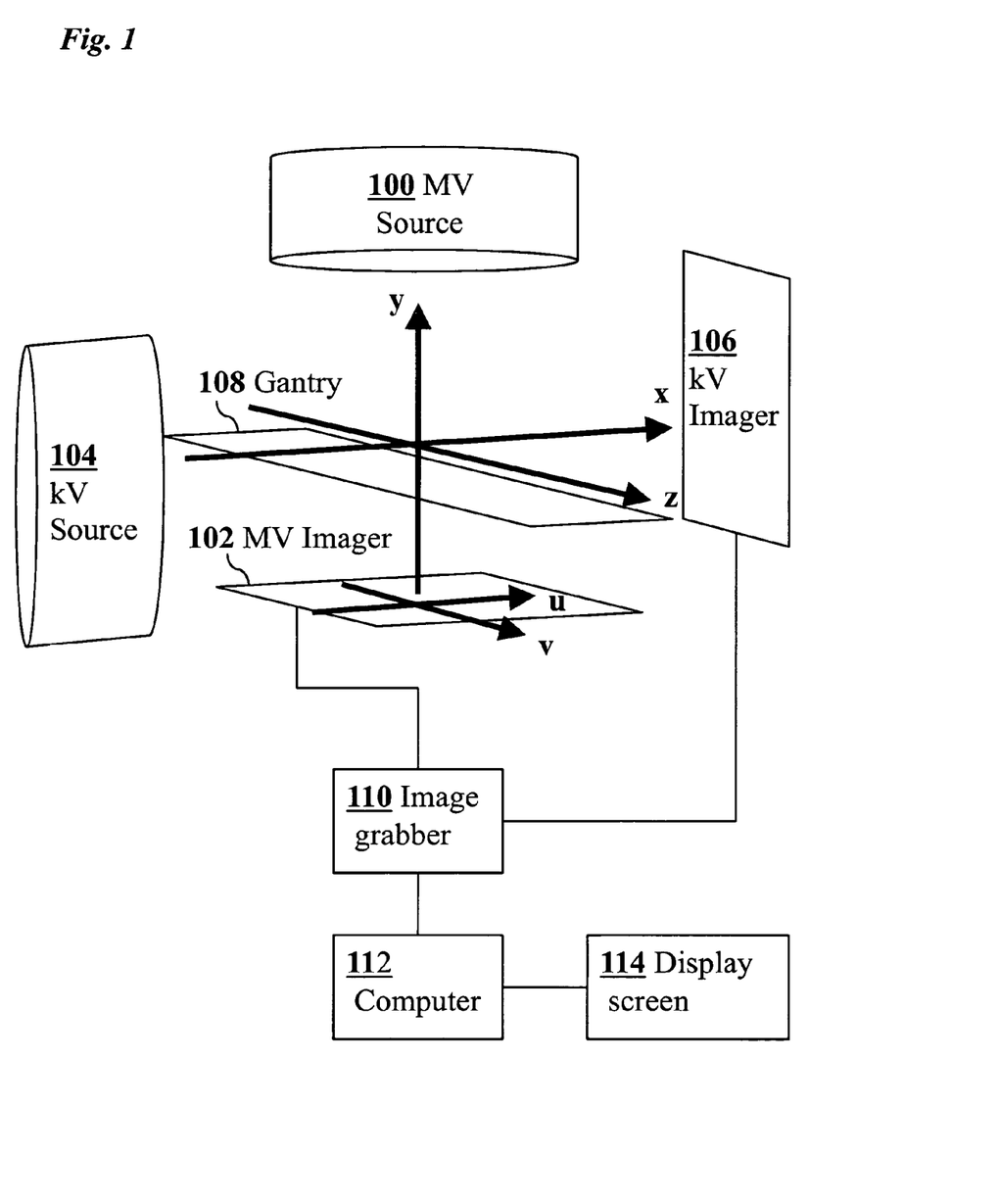
FIG. 1 is a schematic diagram illustrating a radiotherapy system according to an embodiment of the present invention.

In one embodiment of the present invention, schematically illustrated in FIG. 1, an onboard imaging system such as the Trilogy™ system (Varian Medical System, Palo Alto, Calif.) is equipped with both kV and MV imagers. The system includes a MV source 100 and corresponding MV imager 102 aligned along a vertical axis (y-axis), a kV source 104 and kV imager 106 aligned along a horizontal axis (x-axis), and a gantry 108 aligned along a horizontal axis (z-axis) for supporting a patient. The MV source may be a treatment beam. The MV imager may be an amorphous silicon (aSi) x-ray detector, e.g., EPID (PortaVision MV AS-500, Varian Medical System, Palo Alto, Calif.) attached to a LINAC. The kV source and imager may be a continuous fluoroscopy or projection x-ray that is turned on from time to time depending on the clinical requirement. The kV imaging system, for example, may include a kV x-ray tube together with an aSi flat panel imager. In one implementation, pixel sizes of the kV and MV detectors were 0.388 mm and 0.392 mm, respectively. Both detectors had a resolution of 1024×768, corresponding to an effective area of detection of approximately 40 cm×30 cm. The source-to-axis distances (SAD) were set to 100 cm and source-to-imager distances (SID) were set to 150 cm for both MV and kV systems.

The patient (not shown) is positioned on the gantry 108. Fiducial markers are preferably placed in the patient to facilitate the accurate determination of internal organ locations. The markers may be, for example, stainless steel ball bearings (BB), gold (Au) cylinders, or another type of radiopaque marker. The BB diameters may typically vary from 1.57 mm to 4 mm. The Au cylinders are typically 1.2 mm in diameter and 5 mm in length (North West Medical Physics Equipment, MED-TEC Company, Orange City, Iowa).

A hardware image frame grabber 110 is used to capture the kV and MV images acquired using flat panel x-ray detector arrays 104 and 106, and to transfer them to a computer 112 for image analysis and feature tracking. The MV EPID was capable of capturing images at a speed of 7.5 frames per second (fps) and 7.8 fps for energy 6 MV and 15 MV, respectively, while the kV imager had a capturing speed of 15 fps in the fluoroscopic or continuous imaging mode. In another embodiment, two channels of a 4 channel PCI video grabber (ProVideo 149P, ProVideo Co., Taipei Hsien, Taiwan) were used to grab the kV and MV video streams at 30 fps per channel with a resolution of 640×480.

The fiducial locations are extracted from the MV and kV images by computer 112. A software program (C language) was developed to analyze projection images and obtain fiducial positions. All calculations were performed on a Dell Precision 470 workstation (3.4 GHz Xeon CPU and 4 GB RAM).

The tracked features are preferably displayed on a screen 114. In addition, or alternatively, the computed positions of the features are used for assisting or automatically performing positioning of the MV treatment beam.

The geometric accuracy of the fiducial tracking system may be evaluated using a pelvic phantom with embedded fiducials placed on a moveable stage. The geometric accuracy of the system is on the order of ±1 mm or better in all three spatial dimensions. The technique requires minimal hardware modification and may be of particular use for image guided radiation therapy (IGRT) systems.

Other embodiments could make use of multiple kV x-ray sources together with the MV treatment beam for anatomical tracking. It is also possible to place the MV beam detector, kV x-ray source(s), and kV detector(s) either on or off the radiation therapy machine. It is possible to add specific MV segment(s) in treatment beam to aide the MV imaging. It is also possible to replace the kV system by another type of imaging/tracking device operated in conjunction with MV beam.

Figure 2:
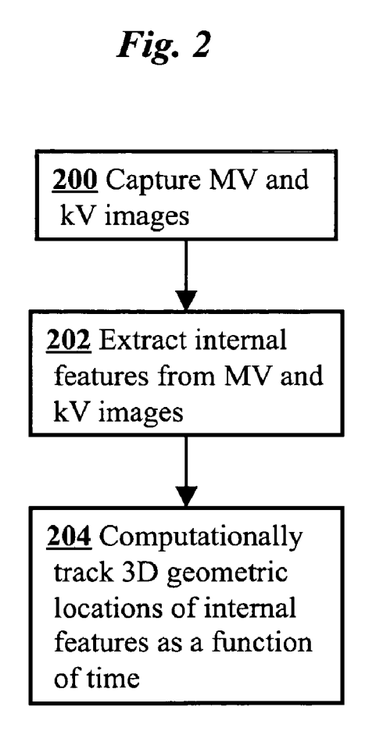
FIG. 2 is a flowchart illustrating an overview of a method for tracking internal features during a radiotherapy treatment, according to an embodiment of the invention.

An overview of a method according to one embodiment is shown in FIG. 2. In step 200 MV and kV images are captured by the image grabber. In step 202 the captured images are processed by a computer to extract internal features from the images. In step 204 the computer computes and tracks 3D geometric locations of the internal features as a function of time. The steps form a processing pipeline so that 3D geometric locations are computed from a sequence of images captured in real time.

Obtain Approximate 3D Positions of FMs from Planning CT

Figure 3:
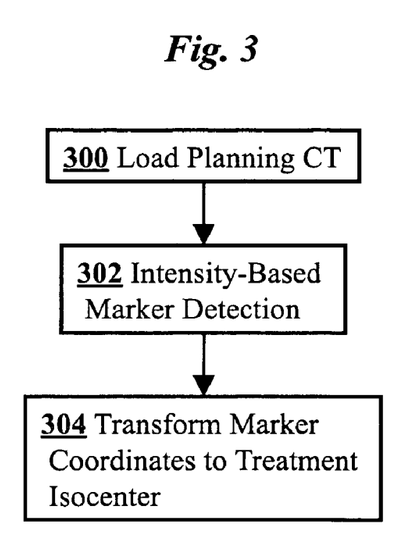
FIG. 3 is a flowchart illustrating steps of a calibration procedure, according to an embodiment of the invention.

A preferred embodiment makes use of calibrated 3D positions of fiducials derived from a planning CT performed prior to treatment. FIG. 3 shows the main steps of this calibration procedure. In step 300 the CT planning image data is loaded. A simple intensity-based search for the markers is performed on the planning CT images in step 302. Due to the much larger CT numbers of the metallic markers relative to other anatomical structures, the markers were easily segmented from the image background. The displacement vector relating the CT isocenter to the treatment isocenter was then used in step 304 to relocate marker CT coordinates relative to the treatment isocenter.

The calibrated 3D marker locations derived from the prior planning CT data provide valuable geometric information that is used by the tracking algorithm to reduce the fiducial search region. Reduction of the search space eliminates unnecessary image processing, resulting in increased fiducial detection speeds to enable real time performance. As will be discussed in more detail below, the calibrated 3D marker locations also provide valuable information to enable tracking when only partial information is available, e.g., due to one or both beams being temporarily blocked or turned off.

Figure 4:
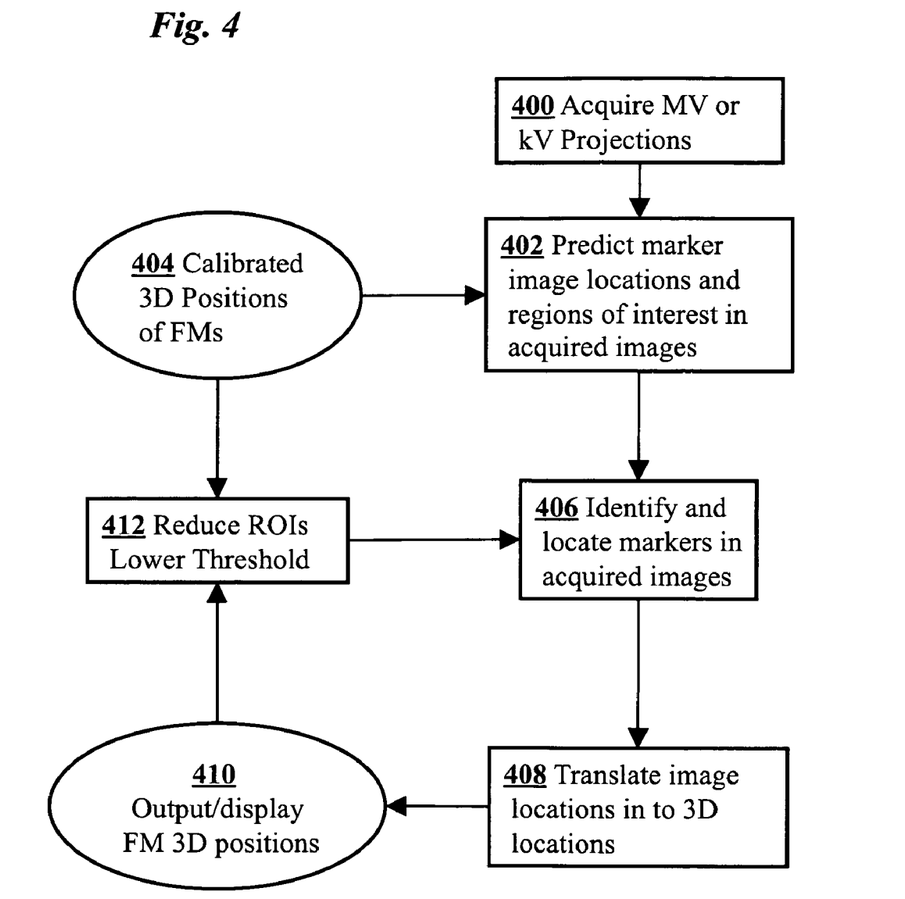
FIG. 4 is a flowchart illustrating steps of a technique for determining real-time 3D locations of internal features from MV and kV image data, according to an embodiment of the invention.

FIG. 4 shows steps of a technique for determining the real-time 3D locations of features such as fiducial markers (FMs) from MV and kV image data captured during treatment. The captured MV and/or kV image projections are acquired in step 400 from the frame grabbers. In step 402, the calibrated 3D positions 404 of the markers, together with current system geometry parameters, are used to predict the expected marker locations in the captured MV and kV image projection planes. Using the calibrated 3D position ($x_B$, $y_B$, $z_B$) of each marker, the expected projection location (u,v) on either the kV detector or the EPID are predicted by the following relationships, $$u = F \frac{\cos(\phi) x_B + \sin(\phi) y_B}{R - \sin(\phi) x_B + \cos(\phi) y_B} \quad \text{(eq. 1, 2)}$$

$$v = F \frac{z_B}{R - \sin(\phi) x_B + \cos(\phi) y_B},$$

where $\phi$ is the gantry angle, R is SAD, and F is SID. As seen in FIG. 1, the x-axis is in the lateral direction of patient couch, the y-axis is in the anterior-posterior direction, z-axis is the superior-interior direction, and the origin is the LINAC's isocenter. The coordinates of the imagers are defined in the u-v plane in FIG. 1 and rotated with the gantry while the v-axis is parallel to z-axis and the u-axis is in the x-y plane.

By locating the expected positions of the marker projections, the search region in the captured images for each marker is reduced to a small circular region of interest (ROI). Typically, a ROI with a radius of 75 pixels, or about 2 cm around the object, is adequate in locating the marker. For markers located near each other, overlapping ROIs may be grouped together. In the case of multiple markers existing in the same ROI group, the detected marker positions in this ROI group may be re-ordered based on the information from the planning CT results including the internal distances between markers and the shortest distances between detected and predicted marker projections, so that every detected fiducial is identified without any confusion. The fiducial search is then performed group by group in order to avoid redundancy.

In one implementation, the ROI may be implemented as a filter which is manually calibrated by entering pixel locations to define a rectangle encompassing each fiducial's range of motion. The initial calibration may be performed by visual inspection and identification to define the ROI for both kV and MV video streams. In the event of a large change in fiducial motion (couch shift or phantom repositioning), the ROI may no longer encompass the entire range of motion of the fiducial, in this case the ROI is recalibrated.

Reduce ROIs

In a preferred embodiment, a method may be used to reduce the ROIs if possible, as indicated in step 412. One method is to use the detected FM locations on the previous image during a continuous imaging course. Due to the short time interval between acquisitions (less than 0.1 seconds) marker movement between consecutive images is limited. Consequently, the new FM location is close to the prior location. For instance, when the ROI radius is reduced to 25 pixels, this still covers a region with a radius of 6.7 mm, which corresponds to any movement with a speed less than 5 cm/s.

Another method for reducing ROIs is to use the calibrated relative positions among markers to locate undetected markers, based on the assumption that their relative positions are fixed. As long as one or more markers are detected, other markers' expected positions may be calculated based on their locations relative to the detected markers. A second search may be performed in smaller ROIs with lower thresholds in order to detect markers with a weaker signal.

In step 406, the markers are identified and located in the regions of interest. In one embodiment, especially suitable for use with spherical markers, the markers may be identified and located using the following sequence of filters: a mean filter to average pixel values to reduce noise, a blob detection filter to segment the fiducial from the background, and a center-of-mass filter to calculate the central pixel location of the blob. The blob filter module was provided by the software package and allows identification of a cluster of pixels, or blob, based on its particular features. By providing features as the size and shape of blobs pertaining to fiducials, the blob filter is able to identify and segment the fiducial from the image even in the presence of a noisy background.

In one implementation, an intensity based fiducial segmentation is performed. Alternatively a pseudo-color followed by a color filter technique can be used, in which case the image data is first converted from grayscale to color using a pseudo-color filter, and a color filter is used to extract a fiducial color value. The pseudo-color filter converts the grayscale image to a spectrum of colors ranging from red to blue, with black corresponding to blue and white to red. Thus, metallic fiducials appear reddish after application of the filter. This allows for easy detection using a red color filter.

Cylindrical Marker Orientation

In the case of cylindrical markers, the unsymmetrical shape results in a host of different possible projection images depending on the marker's particular orientation relative to the source/imager setup. Parameters subjecting to variations are the marker's projection length, which can take values from the marker's width w to its length l, and the marker's orientation, which can take values from 0 degrees to 180 degrees. In one implementation, the following technique is used to detect marker orientations. The 180 degree rotation is divided into a number of bins, e.g., 8 bins where each of the 8 bins represents two possible opposite directions, such that each bin covers an angle of 22.5 degrees. The center of this orientation filter is placed on each pixel in a ROI group, and all adjacent pixels from the center pixel are then grouped into 8 bins corresponding to their particular angle. The average intensity of each bin is computed and the bin with the highest number is taken as the orientation of the particular pixel. It should be noted that the cylindrical orientation results carry no information for most of the pixels and it is only valid for pixels corresponding to a cylindrical object. Although the projection lengths of cylindrical markers might vary with the projection direction, their cross-sections, a narrow section perpendicular to the cylindrical orientation, are unique features and they only depended on the fiducial width and cylindrical orientation. For convenience, the cross-section patterns at all eight cylindrical orientations are pre-calculated for given widths. The cross section of every pixel is then matched with the pre-determined cross-section pattern at the cylindrical orientation of that center pixel.

Pattern Matching Algorithm

Figure 5:
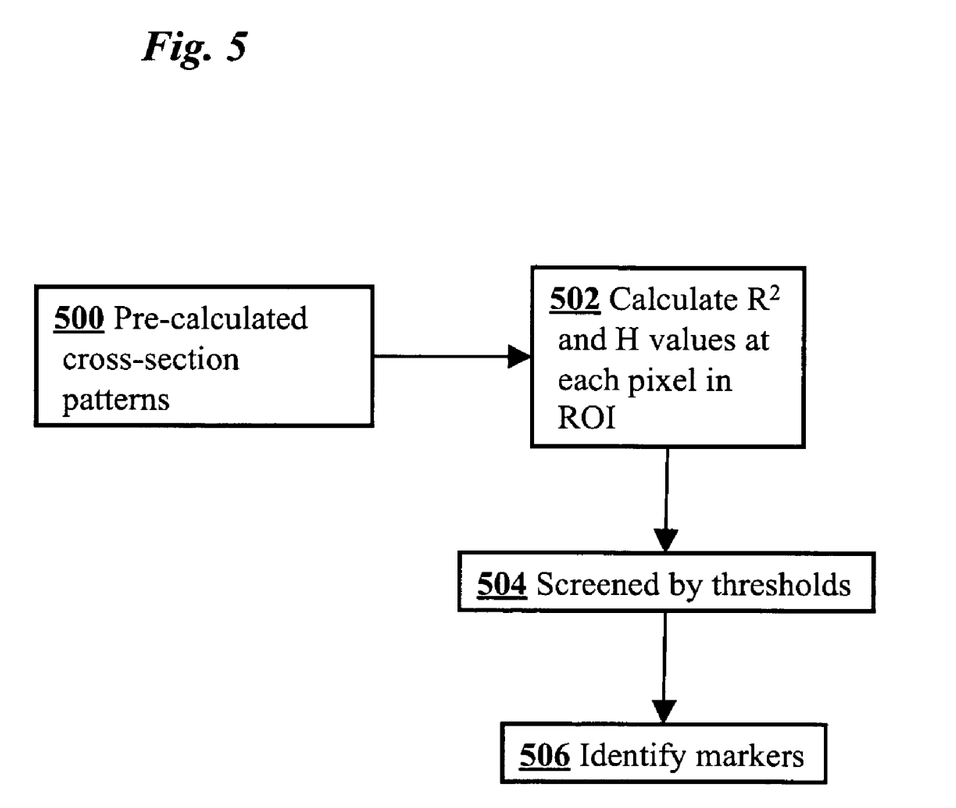
FIG. 5 is a flowchart illustrating steps performed in a pattern matching technique used in an embodiment of the present invention.

FIG. 5 illustrates steps performed in a pattern matching technique used in a preferred embodiment. The technique makes use of a set of pre-calculated cross-sectional patterns 500, which includes different patterns for spherical and cylindrical markers. Due to their geometric symmetry, a simple spherical marker pattern is universal for all BBs with the same physical diameter. Cylindrical marker projections have different orientation and length. The signal intensity distribution along a cross section of cylinder marker matches a trapezoid-like pattern and this matching does not need the information of the cylinder projection length.

Depending on the type of marker expected in the ROI, either a spherical or cylindrical cross section pattern $\{p_{i,j}\}$ is used for the matching procedure. At each pixel location (x,y) within a ROI group, a comparison is made between the pattern and the surrounding pixels ($\{f_{x+i,y+j}\}$), as shown in step 502. Two criteria are used to quantify the matching: the square of the correlation coefficient $R^2_{x,y}$ and the scaling factor $H_{x,y}$, $$R^2_{x,y} = \quad (\text{eq. 3, 4})$$

$$\frac{\sum_{(i,j)\in Pattern}(f_{x+i,y+j} - \overline{f_{x,y}})(p_{i,j} - \overline{p})}{\sqrt{\sum_{(i,j)\in Pattern}(f_{x+i,y+j} - \overline{f_{x,y}})^2} \cdot \sqrt{\sum_{(i,j)\in Pattern}(p_{i,j} - \overline{p})^2}},$$

$$H_{x,y} = \frac{\sum_{(i,j)\in Pattern}(f_{x+i,y+j} - \overline{f_{x,y}})(p_{i,j} - \overline{p})}{\sum_{(i,j)\in Pattern}(p_{i,j} - \overline{p})^2},$$

where $\overline{f_{x,y}}$ is the average intensity of the pattern region around pixel (x,y) and $\overline{p}$ is the average intensity of the pattern distribution as given by, $$\overline{f_{x,y}} = \frac{1}{N}\sum_{(i,j)\in Pattern} f_{x+i,y+j}, \quad (\text{eq. 5, 6})$$

$$\overline{p} = \frac{1}{N}\sum_{(i,j)\in Pattern} p_{i,j},$$

with N being the total pixel number of the pattern. The square of the coefficient of correlation or coefficient of determination for a linear regression is called R-square or $R^2$. It varies from 0 (no correlation) to 1 (perfect correlation). The scaling factor, H, indicates the relative intensity of the object compared to the background. As an example, in an ideal case, the image is scaled from the pattern after a background shift, $f_{x+i,y+j}=k \cdot p_{i,j}+b$, where k and b are constants. The pattern matching result is then $R^2_{x,y}=1$ and $H_{x,y}=k$.

Because the cylindrical cross-section pattern is unable to determine correct marker lengths, adjacent qualified cross-sections are grouped and their overall lengths reconstructed. If the calculated length is within w to l it is accepted as a marker, otherwise the feature is rejected.

In step 504, after the $R^2$ and H values are calculated for every pixel in the ROIs, they are screened based on predefined thresholds. For pixels that pass the threshold, adjacent pixels are examined, and an overall length for the fiducial is determined. The presumed fiducial is rejected if its overall length is longer than a pre-defined maximum length.

The scaling of the ROIs provides greater background image segmentation for the kV case over the MV case. The product of the scaling factor H and the correlation $R^2$ provides complete segmentation of the markers. In this case thresholds of 0.6 and 0.006 are used for $R^2$ and H, respectively.

Marker Identification

In step 506, the detected markers in the kV or MV projection images are identified with the set of calibrated markers. When only one marker exists in each ROI group, there is a direct correlation of the ROI group to a specific marker. In the case of multiple markers existing in the same ROI group, the detected marker positions in the ROI group are correlated to the planning CT markers corresponding to the ROI group, while indexing is based on the shortest distances between detected and predicted marker projections by using Eqs. (1) and (2). At certain gantry angles, it is possible that two or more markers might be projected to the same (u,v) location on the detector. In this case the number of detected markers in the ROI group is less than the number of expected markers. Here the detected marker is counted multiple times up to the total number of expected markers.

Calculate 3D Coordinates from Orthogonal Dual Projections

Returning to FIG. 4, after having identified and located the markers in the projected images, in step 408 the nearly real-time 3D positions of fiducial markers are calculated from the marker projections on two orthogonal imagers. Every marker $(x_M, y_M, z_M)$ has two projections: $(x_{MV}, y_{MV})$ on MV imager and $(x_{kV}, y_{kV})$ on kV imager. The real-space (x,y,z) marker locations from system isocenter may be calculated using the relations $$\frac{x_{MV}}{d_{MV-s} + d_{MV-d}} = \frac{x}{d_{MV-s} - z}$$

$$\frac{y_{MV}}{d_{MV-s} + d_{MV-d}} = \frac{y}{d_{MV-s} - z}$$

$$\frac{x_{kV}}{d_{kV-s} + d_{kV-d}} = \frac{z}{d_{kV-s} + x}$$

$$\frac{y_{kV}}{d_{kV-s} + d_{kV-d}} = \frac{y}{d_{kV-s} + x}.$$

Figure 6:
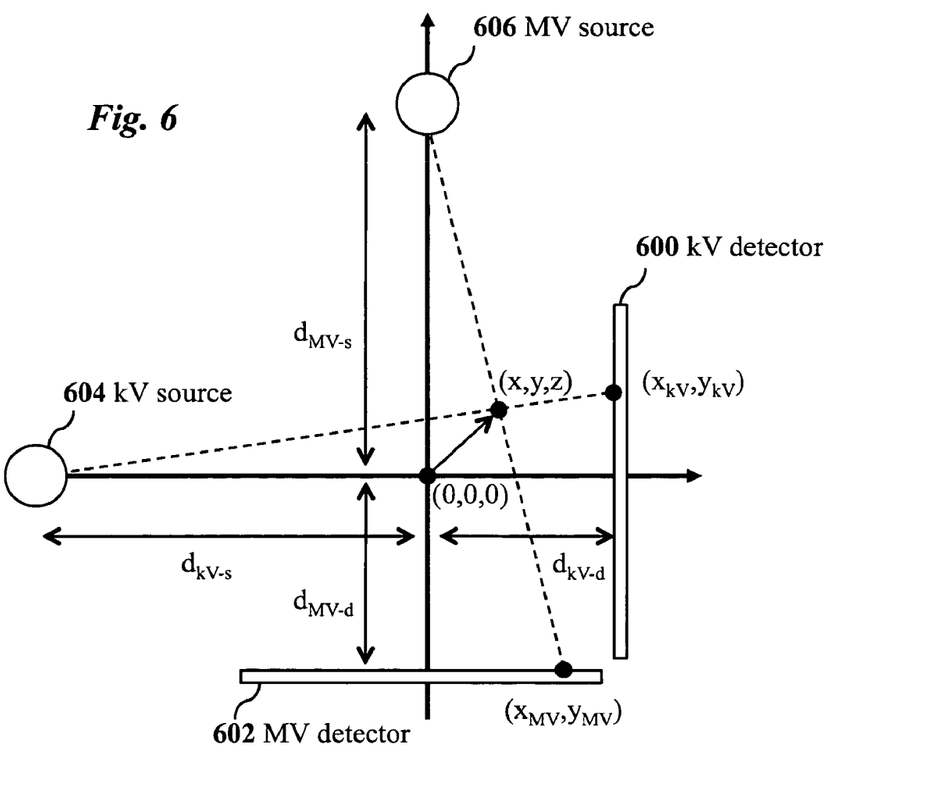
FIG. 6 is a schematic diagram illustrating geometric relationships associated with a radiotherapy system and method, according to an embodiment of the invention.

Here (x,y,z) corresponds to the marker's position from system isocenter where the isocenter is defined at 100 cm SSD and the center of the MV beam. The kV and MV photon source-to-isocenter distances are given by $d_{kV-s}$ and $d_{MV-s}$, respectively. The isocenter to kV and MV detector distances are given by $d_{kV-d}$ and $d_{MV-d}$, respectively. FIG. 6 illustrates these geometric relationships of these quantities, where 600 is the kV detector plane, 602 is the MV detector plane, 604 is the kV source, and 606 is the MV source.

In one implementation, the coordinate transformation uses a custom script filter to convert the pixel location to a real-space location from system isocenter. In step 410 the 3D locations are output and/or displayed to assist with treatment beam localization.

Tracking with Partial Information

In some circumstances, only partial information about the marker positions is available in the projected images captured by the kV and MV detectors. For example, the MV beam-defining aperture may block the view of the marker/organ on the MV imager, the fiducial may be blocked by a high-density material such as bone, or one beam is turned on (either the kV or MV treatment beam) and the other off. An partial information method may be used to allow continuous 3D motion tracking in the event that only partial spatial/temporal information is available. The partial information method (PIM) uses previous position knowledge for assemblage of full 3D target location as a function of time. This may be useful for modalities such as IMRT where the MV beam can switch on and off during treatment. The PIM can also be used to reduce the adverse effects of scattered radiation from either the kV or MV x-ray source from being detected by the non-intended flat panel imager. This can be accomplished by alternating the kV and MV beams, such that one x-ray source does not influence the other.

As an example, a multileaf collimator (MLC) may partly or completely block fiducials at certain segments. There are five sources of information may be used in this situation for tracking. Firstly, the coordinates of any fiducial from the orthogonal kV imaging are always available regardless of whether or not the fiducial is blocked in MV images. This piece of information is very valuable in estimating the position of this fiducial on MV imager because the kV projection result indicates that the fiducial locates on a kV x-ray trace from the kV source to the kV projection. Its possible projection on MV imager will be on the projection of this kV x-ray trace. Coordinates of kV and MV projections of the same fiducial on the common axis, the v-axis, are close to each other. Thus, locations of markers on the kV image can be used to reduce the ROI when searching the MV image. Secondly, fiducial kinetics obtained at the previous time point can be utilized by a prediction algorithm to facilitate estimation of marker position as discussed earlier in relation to step 412. Thirdly, the detected fiducials' positions can be used to locate other blocked fiducials based on their relative positions, as discussed earlier as well in relation to step 412. Fourthly, the MLC leaf positions are always available from the EPID images, which can serve as a useful landmark for fiducial position estimation because the fiducials should be either detected or in the MLC leaf blocked area. An additional step to screen and define the MLC field after MV images are acquired may be used. An intensity threshold may be computed from the minimum and maximum intensity of the whole image and then used for segmenting the MV field from the MLC blocked area by a simple intensity based screening process. Fifthly, the 3D movement of the markers captured by the pre-treatment 4D CBCT and simulation 4D CT is also available for positional prediction. For example, an elliptic ROI may be used for a known tumor-motion direction instead of a circular ROI. This will reduce the size of possible MV projection locations in certain directions. Furthermore, it would reduce the length of 1D possible MV projection locations predicted by orthogonal kV imaging results.

Performance of Analysis Software

In one implementation, in-house software (C language) is specified to analyze projection images and obtain fiducial positions. The computations may be performed on a special purpose computer or general purpose computer, e.g., a desktop workstation.

Regarding the analysis software programming, it is important to compute the location of a marker quickly so to be able to track the markers at a speed of 10 fps or higher. Most of the calculation time is spent on the pattern matching, including determining orientation and calculating intensity and $R^2$. A complete search on 1024×768 pixels image costs about 1 second on current hardware. The search region of three markers with a radius of 75 pixels reduces the calculation time by an order of magnitude. The average search time for three markers is 0.08 seconds per frame. Basically, kV and MV images could be analyzed independently. It is generally much easier to track markers on kV images than on MV images not only because kV images have better contrast but also because they are always open-field. However, this does not mean that double the calculation time is needed for simultaneous kV and MV image analysis because the kV tracking results might be used to reduce MV ROIs in addition to the other two methods to reduce ROIs. This process significantly reduces the size of ROIs on MV images and reduces the computation time. About 0.1 seconds analysis time per kV/MV pair is achievable on our current single CPU architecture. Reduced computation time is expected if parallel computation is implemented on multiple-core processor.

Discussion

For the tested projection images, the algorithm demonstrates high successful detection rates together with real-time speeds. Unlike some prior methods where only the pattern correlation $R^2$ is used for marker detection, the present technique employs both correlation $R^2$ and a scaling factor H for marker detection. Reliance on only $R^2$ leads to false positive marker detection, especially for MV based projections. The combination of these two criteria leads to 100% success detection rates for all 3,500 images kV or MV projections analyzed. It is important to emphasize that multiple markers could be successfully tracked on MV images.

Fast marker detection is a crucial component of real-time image based tracking. This technique quickens the search process in at least two ways. Firstly, the orientation and cross sectional pattern matching for cylindrical markers simplifies the problem due to cylindrical orientation and projection length, which would otherwise require a large amount of patterns to be tested. Typically, only eight cross sectional patterns are sufficient to account for all possible cylindrical orientation and projection lengths. Secondly, the search space is significantly reduced by incorporating prior CT marker location knowledge. For a typical 1024×768 image with five cylindrical markers, the processing time is reduced from about 1 second to 0.1 seconds upon incorporating ROI selection. For fewer markers this time would be reduced even further. Generally, detecting spherical markers takes only about half the time as compared to detecting the same number of cylindrical markers. In addition, this process is completely automated and does not need any manual location initializations, which is another asset.

Once faster kV and MV detectors become available, ROIs can be further reduced. In general, the travel distance of the marker between frames (about 0.1 s) will be very small in comparison to the 4 cm in diameter of the ROI used for detection here. Simply using the marker's location on the previous frame to predict the marker's location in the currently analyzed frame will allow a significantly reduced ROI size to be used. This does not involve any motion or respiratory pattern, which may not be available.

The accuracy of predicting MLC blocked fiducials could be further enhanced. More pre-treatment information about the tumor/fiducial motions will help to further reduce the possible length of one-dimensional projections. It is also recommended to keep all segment sizes large enough to include at least one fiducial. The estimation based on internal distances can be more accurate too if the internal deformation is small. The proposed procedure will be a very economic solution since more and more linear accelerators are equipped with an onboard kV imaging system. This procedure does not need any extra expensive equipment such as multiple kV imaging sets. At the same time, using treatment beam as part of tracking reduces extra dose to the patient. In addition, it is possible to control the kV imaging collimator to reduce the kV field size because only the imaging of fiducials matters in this procedure. The kV beam delivery can be planned to conform to the planning target volume and hence spare critical organs and healthy tissue.

This process can handle a MLC moving and segment the MV field from MLC blocking quickly. This makes it applicable to track fiducials during an IMRT treatment. However, some IMRT plans contain very small segments and all fiducials may be outside of the MV field. Although the MV projections of those markers are unavailable, it is still possible to locate their 3D positions to a very small region. Clinically, the one-dimensional possible projections indicate the fiducial motion within a short distance at one-dimension. This piece of information may be helpful to make the decision whether a portion of the tumor is outside of the MV field and whether the treatment should be paused immediately.

The invention claimed is:

1. A medical imaging-based method for organ motion tracking as a function of time, the method comprising:
    capturing kV images during a treatment period using a kV imaging detector;
    capturing MV images during the treatment period using an MV radiotherapy beam imaging detector;
    extracting 2D kV projection locations of internal features from the captured kV images;
    extracting 2D MV projection locations of the internal features from the captured MV images;
    combining the extracted 2D kV projection locations and extracted 2D MV projection locations with information describing geometry of the kV imaging detector and MV radiotherapy beam imaging detector to calculate 3D locations of the internal features; and
    computationally tracking 3D geometric locations of the internal features as a function of time from the 3D locations of the internal features and information of previous positions of the internal features.

2. The method of claim 1 wherein the capturing kV images comprises capturing the kV images continuously during the treatment period.

3. The method of claim 1 wherein the capturing kV images comprises capturing the kV images intermittently during the treatment period.

4. The method of claim 1 wherein the internal features are natural biological features.

5. The method of claim 1 wherein the internal features are implanted fiducials.

6. The method of claim 1 wherein the kV imaging detector is a kV diagnostic imaging detector.

7. The method of claim 1 wherein computationally tracking comprises using a partial information method.

8. A medical imaging system comprising:
    a) kV and MV beam generators for generating kV and MV beams;
    b) kV and MV x-ray detector arrays for detecting the kV and MV beams;
    c) an image grabber to capture kV images and MV images acquired using the x-ray detector arrays, and
    d) a computer for extracting 2D kV projection locations of the internal features from the kV images, extracting 2D MV projection locations of the internal features from the MV images, combining the extracted 2D kV projection locations and extracted 2D MV projection locations with information describing geometry of the kV imaging detector and MV radiotherapy beam imaging detector to calculate 3D locations of the internal features, computing continuous 3D geometric locations of internal features as a function of time from the 3D locations of the internal features and information of previous positions of the internal features.

9. The method of claim 8 wherein the kV and MV x-ray detectors are flat panel detectors.

10. The method of claim 8 wherein the image grabber is a hardware frame grabber.

* * * * *

UNITED STATES PATENT AND TRADEMARK OFFICE
CERTIFICATE OF CORRECTION

PATENT NO.       : 8,121,368 B2
APPLICATION NO.  : 12/291829
DATED            : February 21, 2012
INVENTOR(S)      : Wiersma It is certified that error appears in the above-identified patent and that said Letters Patent is hereby corrected as shown below:

In column 1, line 17, replace "CAI04205" with "CA104205".

Signed and Sealed this
Eighth Day of May, 2012

David J. Kappos
*Director of the United States Patent and Trademark Office*